(12) United States Patent
Yang

(10) Patent No.: US 7,593,191 B2
(45) Date of Patent: Sep. 22, 2009

(54) HGA HAVING SEPARATE DIMPLE ELEMENT, DISK DRIVE UNIT WITH THE SAME, AND MANUFACTURING METHOD THEREOF

(75) Inventor: Huai Yang, DongGuan (CN)

(73) Assignee: Sae Magnetics (H.K.) Ltd., Hong Kong (CN)

( * ) Notice: Subject to any disclaimer, the term of this patent is extended or adjusted under 35 U.S.C. 154(b) by 418 days.

(21) Appl. No.: 11/492,927

(22) Filed: Jul. 26, 2006

(65) Prior Publication Data
US 2008/0024928 A1    Jan. 31, 2008

(51) Int. Cl.
*G11B 5/48* (2006.01)
(52) U.S. Cl. .................................... 360/245.1
(58) Field of Classification Search ................ 360/245, 360/245.1, 245.2, 245.3, 245.7; 29/603.04
See application file for complete search history.

(56) References Cited

U.S. PATENT DOCUMENTS

| | | | | |
|---|---|---|---|---|
| 5,943,190 A * | 8/1999 | Fanslau, Jr. | ............... | 360/245.3 |
| 5,973,884 A * | 10/1999 | Hagen | ...................... | 360/245.3 |
| 6,181,522 B1 * | 1/2001 | Carlson | .................... | 360/245.1 |
| 6,181,525 B1 * | 1/2001 | Carlson | .................... | 360/245.7 |
| 6,304,420 B1 * | 10/2001 | Murphy et al. | ........... | 360/245.7 |
| 6,400,532 B1 * | 6/2002 | Mei | ......................... | 360/245.1 |
| 6,545,843 B1 * | 4/2003 | Suzuki | ..................... | 360/245.1 |
| 6,549,374 B1 * | 4/2003 | Ikeda et al. | ............... | 360/245.3 |
| 6,549,376 B1 * | 4/2003 | Scura et al. | .............. | 360/245.3 |
| 6,898,841 B2 * | 5/2005 | Shiraishi | ................... | 29/603.04 |
| 2004/0190202 A1 * | 9/2004 | Koh et al. | ................. | 360/245.1 |
| 2005/0275972 A1 * | 12/2005 | Takahashi | ................ | 360/245.1 |
| 2008/0239577 A1 * | 10/2008 | Zeng et al. | ................ | 360/245.1 |

* cited by examiner

*Primary Examiner*—Brian E Miller
(74) *Attorney, Agent, or Firm*—Nixon & Vanderhye, P.C.

(57) ABSTRACT

A HGA of the invention includes a slider, a load beam having a locating hole formed therein; a flexure to support the slider and connect with the load beam; a separate dimple element having a dimple to extend through the locating hole and support the flexure at a position corresponding to a center area of the slider. The invention also discloses a method for manufacturing the HGA and a disk drive unit with the HGA.

3 Claims, 11 Drawing Sheets

HGA HAVING SEPARATE DIMPLE ELEMENT, DISK DRIVE UNIT WITH THE SAME, AND MANUFACTURING METHOD THEREOF

FIELD OF THE INVENTION

The present invention relates to information recording disk drive devices and, more particularly, to a head gimbal assembly (HGA) having a separate dimple element, disk drive unit with the same, and manufacturing method thereof.

BACKGROUND OF THE INVENTION

One known type of information storage device is a disk drive device that uses magnetic media to store data and a movable read/write head that is positioned over the media to selectively read from or write to the disk.

FIGS. 1a and 1b illustrate a conventional disk drive device and show a magnetic disk 101 mounted on a spindle motor 102 for spinning the disk 101. A voice coil motor arm 104 carries a head gimbal assembly (HGA) 100 that includes a slider 103 incorporating a read/write head. A voice-coil motor (VCM, not labeled) is provided for controlling the motion of the motor arm 104 and, in turn, controlling the slider 103 to move from track to track across the surface of the disk 101, thereby enabling the read/write head to read data from or write data to the disk 101. In operation, a lift force is generated by the aerodynamic interaction between the slider 103, incorporating the read/write transducer, and the spinning magnetic disk 101. The lift force is opposed by equal and opposite spring forces applied by the HGA 100 such that a predetermined flying height above the surface of the spinning disk 101 is maintained over a full radial stroke of the motor arm 104.

Now referring to FIGS. 2a-2c, a HGA 100 of the conventional disk drive device of FIGS. 1a-1b comprises a load beam 106, a flexure 105 to connect with the flexure 105, and a slider 103 held on the flexure 105 at a distal end of the flexure 105. The HGA 100 is mounted to the motor arm 104. The load beam 106 has a dimple 107 integrally formed thereon to support the flexure 105 at a position corresponding to a center of the slider 103. During operation, the load forces coming from the HGA 100 are transferred to the center of the slider 103 via the dimple 107. The load forces are balanced by the opposite and equal lift force generated by aerodynamic interaction between the slider 103 and the spinning disk 101, thus making the slider 103 floating at a predefined flying height and maintaining a proper flying attitude, and realizing good data reading/writing operation for the disk drive.

It is desired that the dimple contact the flexure at a very accurate position which is exactly consistent with the center of the slider, and the contact area between the dimple and the flexure is as small as possible, so that the load forces can be uniformly transferred to the slider, thereby achieving optimal flying attitude and maintaining stable flying performance for the slider. Accordingly, with continuous miniaturization of the slider, the dimple should become small enough to contact the flexure at a position corresponding to the center of the slider fittingly and keep a very small contact area therebetween. However, in conventional HGA described above, since the dimple is integrally formed with the load beam, due to reasons such as die fabrication and dimension limitation of machine, it is difficult to manufacture a load beam with a size-reduced dimple incorporated thereon; consequently, when a slider of smaller form factor is mounted on the flexure, the dimple appears larger and larger with respect to the slider, and the contact area between the original dimple and size-reduced slider will be changed. This change in turn degrades flying attitude of the slider and finally influences badly the flying performance of the slider over the rotary disk, thereby deteriorating reading/writing capability of the disk drive unit when in use.

In addition, as shown in FIG. 2d, when in a conventional HGA assembling process, the load beam 106 and the flexure 105 are connected together in advance, and then the slider 103 is mounted to the flexure 105. Since presence of the dimple 107 between the load beam 106 and the flexure 105, the flexure 105 becomes tilting with respect to the load beam 106, and due to the tilt, the load beam 106 and the flexure 105 cannot be assembled with high positional precision. Consequently, when the slider is mounted on the flexure, the slider will have poor alignment with the dimple, thus further negatively affecting flying attitude and performance of the slider. Moreover, the tilt of the flexure relative to the load beam results in difficult in slider electrical bonding.

Thus, there is a need to provide an improved HGA that does not suffer from the above-mentioned drawbacks.

SUMMARY OF THE INVENTION

An aspect of the present invention is to provide a HGA for a disk drive unit, which can greatly improve flying performance of a slider, simplify manufacturing process and improve manufacturing accuracy of the HGA.

Another aspect of the present invention is to provide a disk drive unit, which can greatly improve flying performance of a slider, simplify manufacturing process and improve manufacturing accuracy of the HGA.

A further aspect of the invention is to provide a method of manufacturing a HGA, which can make whole HGA assembling process easy and improve assembling precision thereof.

To achieve the above aspects, a HGA for a disk drive unit comprises a slider; a load beam having a locating hole formed therein; a flexure to support the slider and connect with the load beam; and a separate dimple element having a dimple. The dimple extends through the locating hole and supports the flexure at a position corresponding to a center area of the slider.

In an embodiment of the invention, the separate dimple element may further comprise a base portion to hold the dimple, by which the separate dimple element is fixed to the load beam. The base portion may be any suitable shape such as a flat plate to firmly attach the separate dimple element to the load beam. In addition, the base portion may be attached to the load beam by any suitable manner such as laser welding or adhesive.

A disk drive unit of the invention comprises a HGA, a drive arm connected to the HGA, a disk and a spindle motor to spin the disk. The HGA for a disk drive unit comprises a slider; a load beam having a locating hole formed therein; a flexure to support the slider and connect with the load beam; and a separate dimple element having a dimple. The dimple may extend through the locating hole and supports the flexure at a position corresponding to a center area of the slider.

A method for manufacturing a HGA, comprises the steps of: providing a flexure and a load beam with a locating hole formed therein; assembling the flexure and the load beam together; providing a slider and mounting it to the flexure; providing a separate dimple element having a dimple; and assembling the separate dimple element to the load beam to make the dimple extend through the locating hole and support the flexure at a position corresponding to a center area of the slider.

In an embodiment, the step of providing the separate dimple element may further comprise a step of forming a base portion, from which the dimple is extended, and the step of assembling the separate dimple element to the load beam may comprise a step of mounting the base portion to the load beam. Moreover, the base portion may be mounted to the load beam by any suitable method for example laser welding or adhesive.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 1b is a partial perspective view of the disk drive unit shown in FIG. 1a;

FIG. 2b shows a partial perspective view of a load beam of the HGA shown in FIG. 2a;

FIG. 2c shows a side view of the HGA shown in FIG. 2a;

FIG. 2d shows a side view illustrating a process of mounting a slider to a flexure of the HGA shown in FIG. 2a;

FIG. 3b shows a partial perspective view of a load beam of the HGA of FIG. 3a;

FIG. 3c shows a perspective view of a separate dimple element of HGA of FIG. 3a;

FIG. 3f shows a partial side view of the HGA of FIG. 3a;

DETAILED DESCRIPTION OF ILLUSTRATED EMBODIMENTS

Several example embodiments of a HGA will now be described. It is noted that the HGA may be implemented in any suitable disk drive device having a HGA, regardless of the specific structure of the HGA as illustrated in the figures. That is, the invention may be used in any suitable device having a HGA in any industry.

Figure 1A:
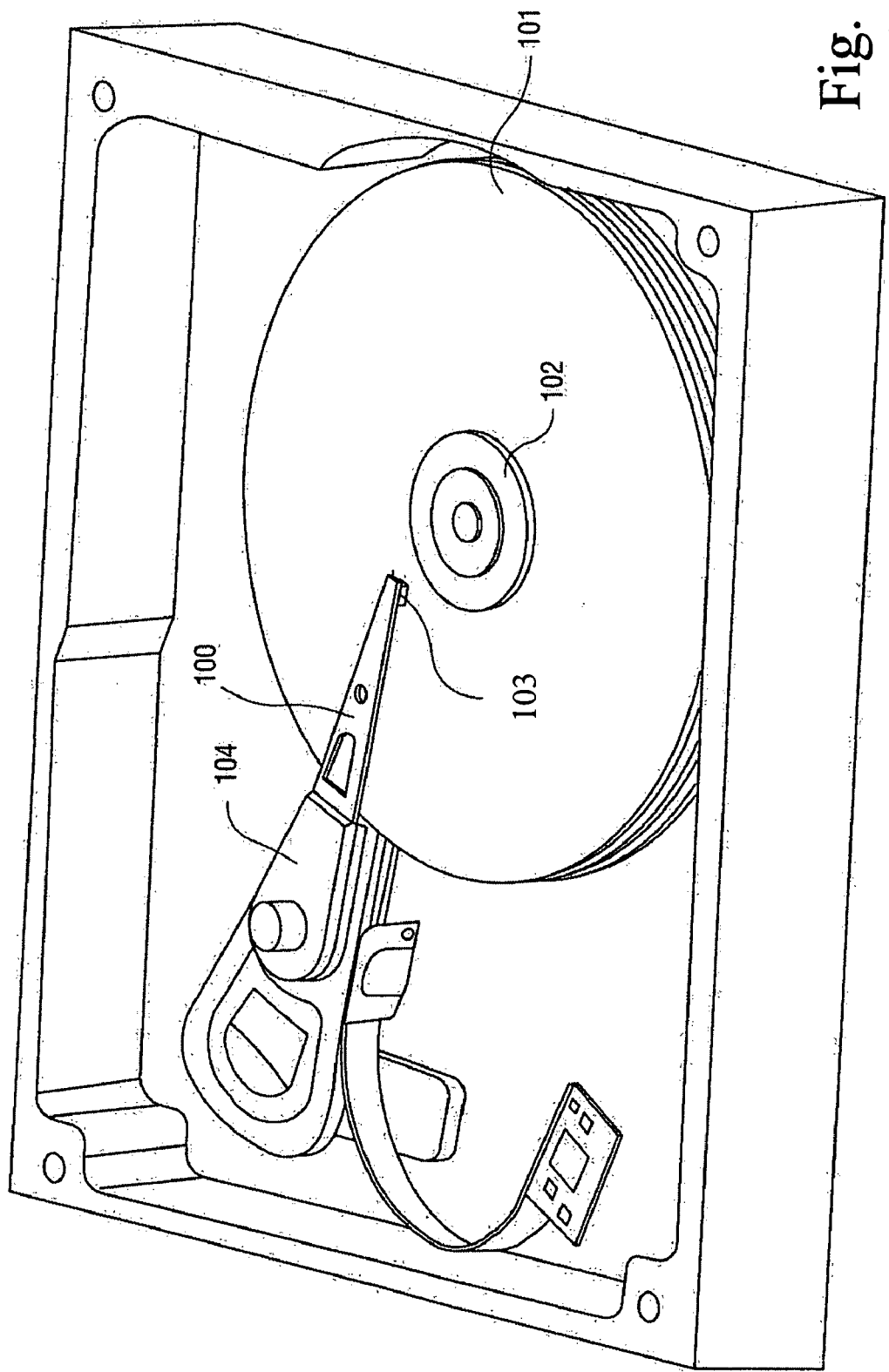
FIG. 1a is a perspective view of a conventional disk drive unit.
Figure 1B:
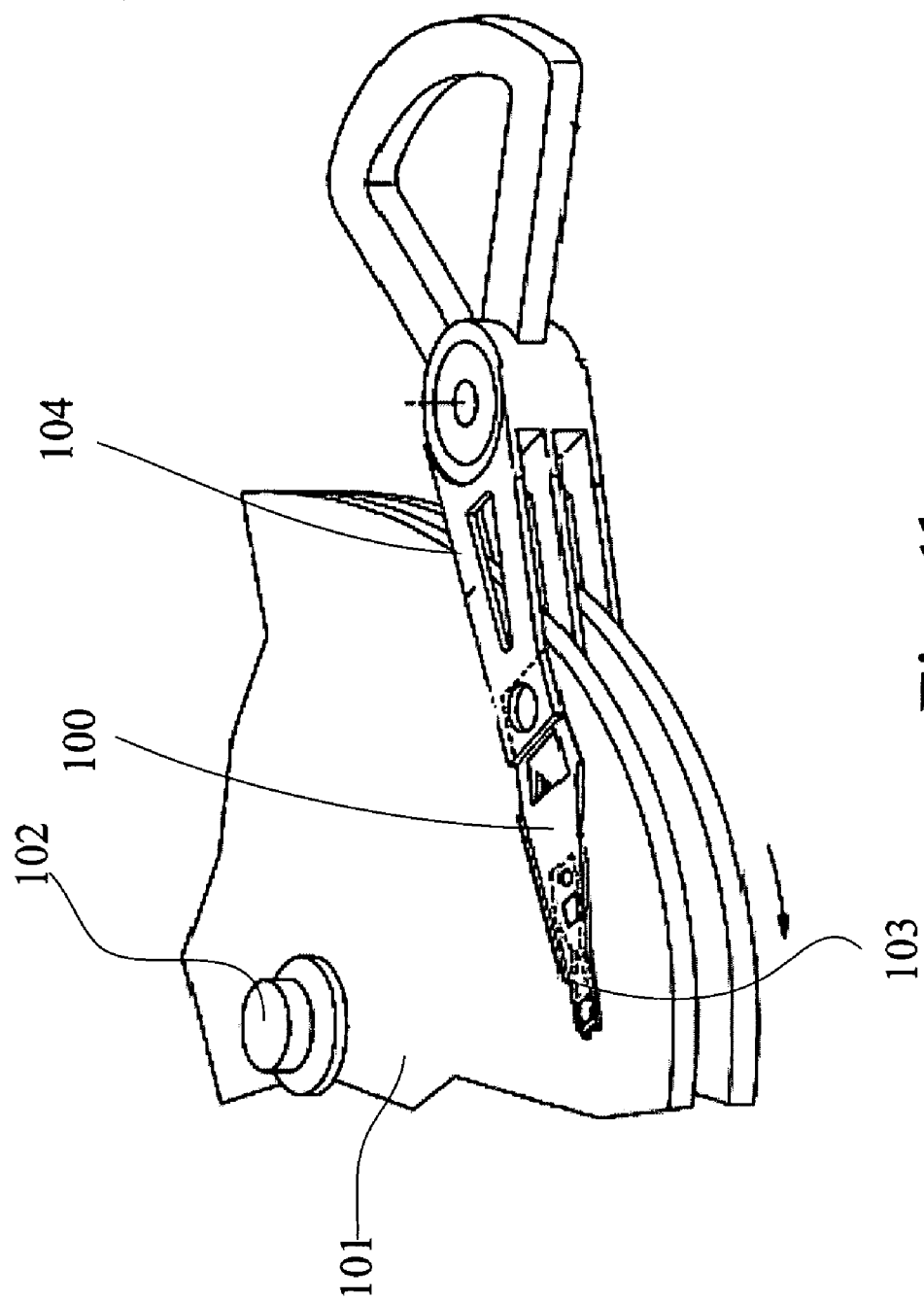
Figure 2A:
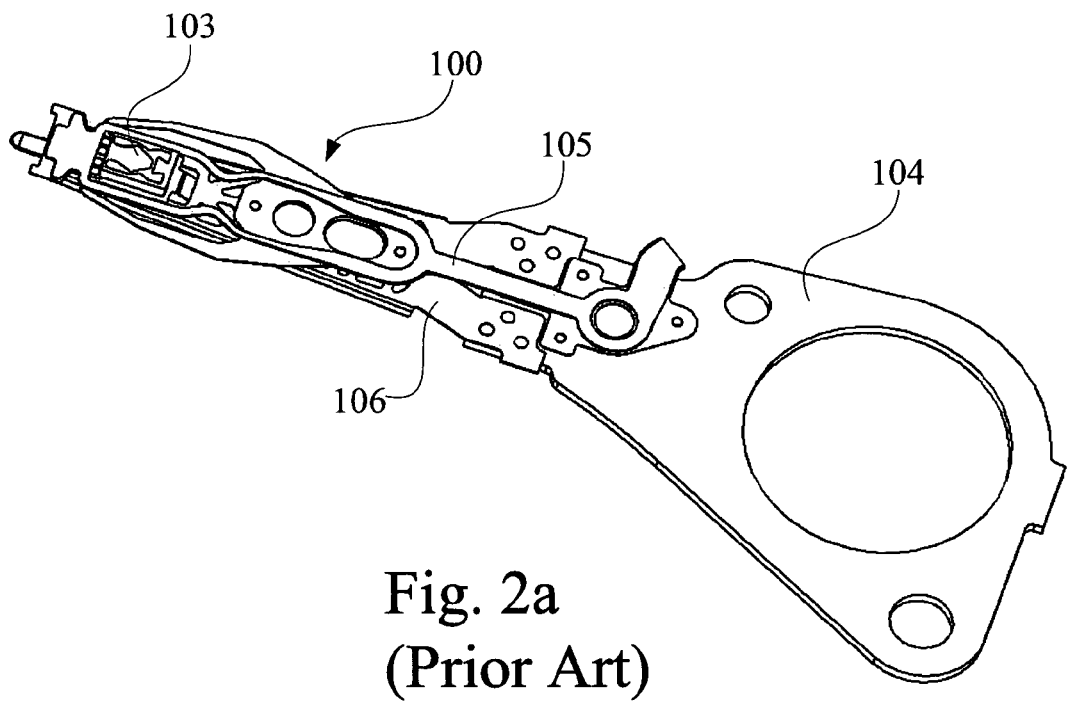
FIG. 2a shows a conventional HGA connected to a motor arm of a disk drive unit.
Figure 2B:
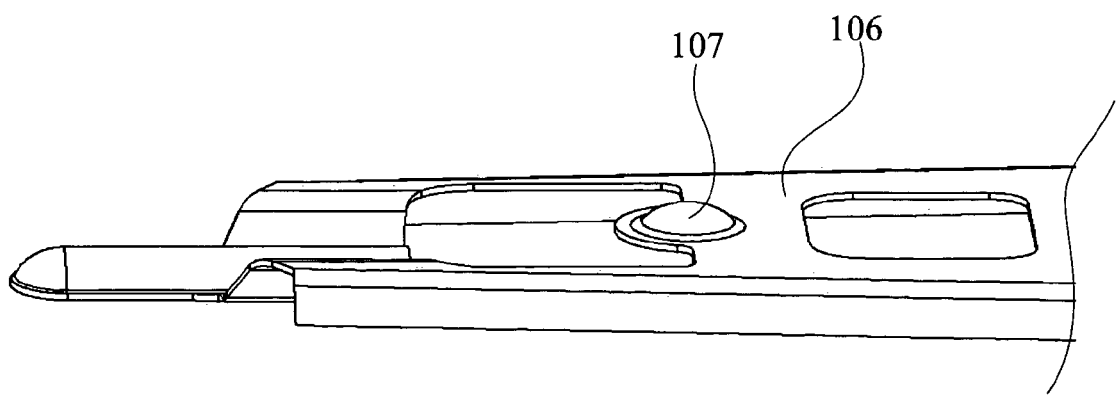
Figure 2C:
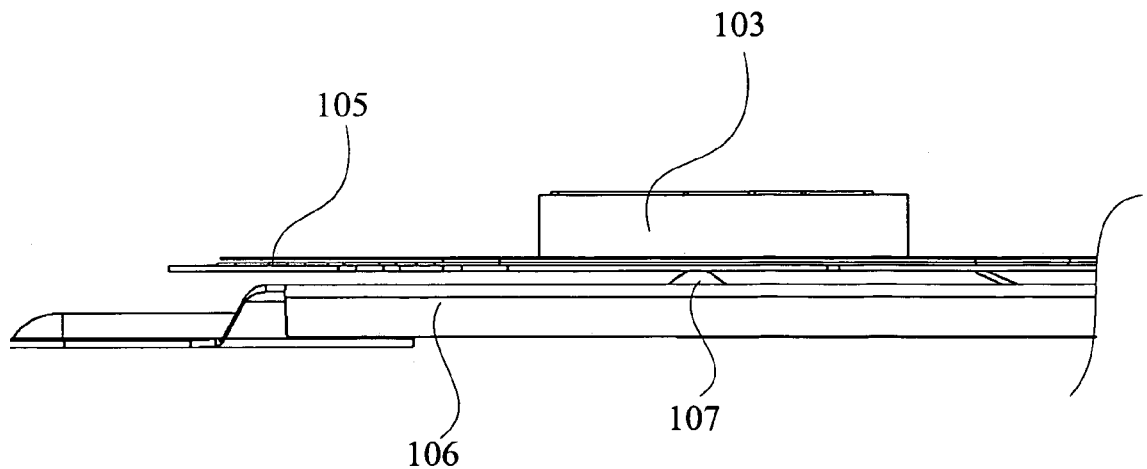
Figure 2D:
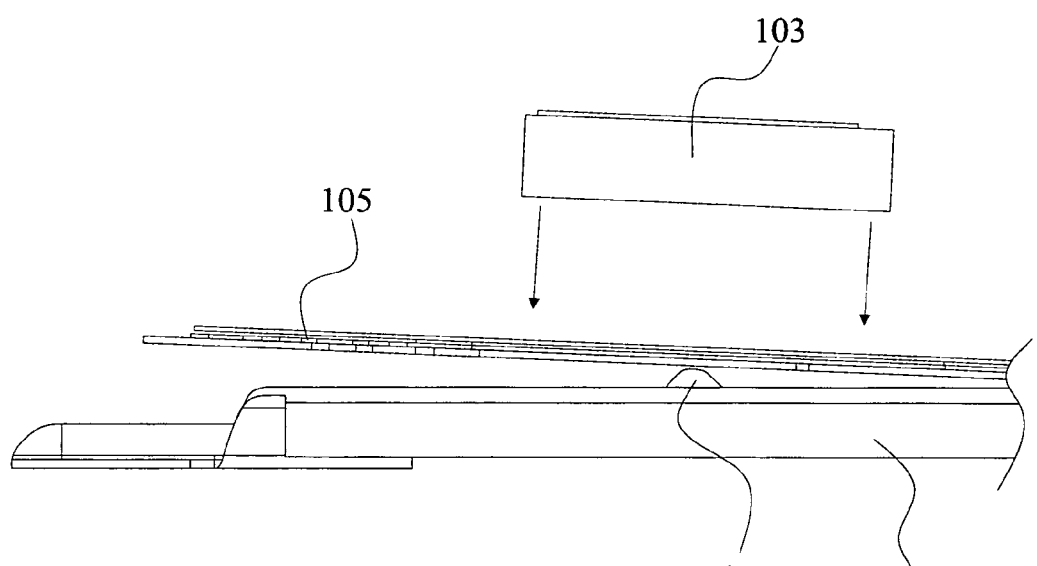
Figure 3A:
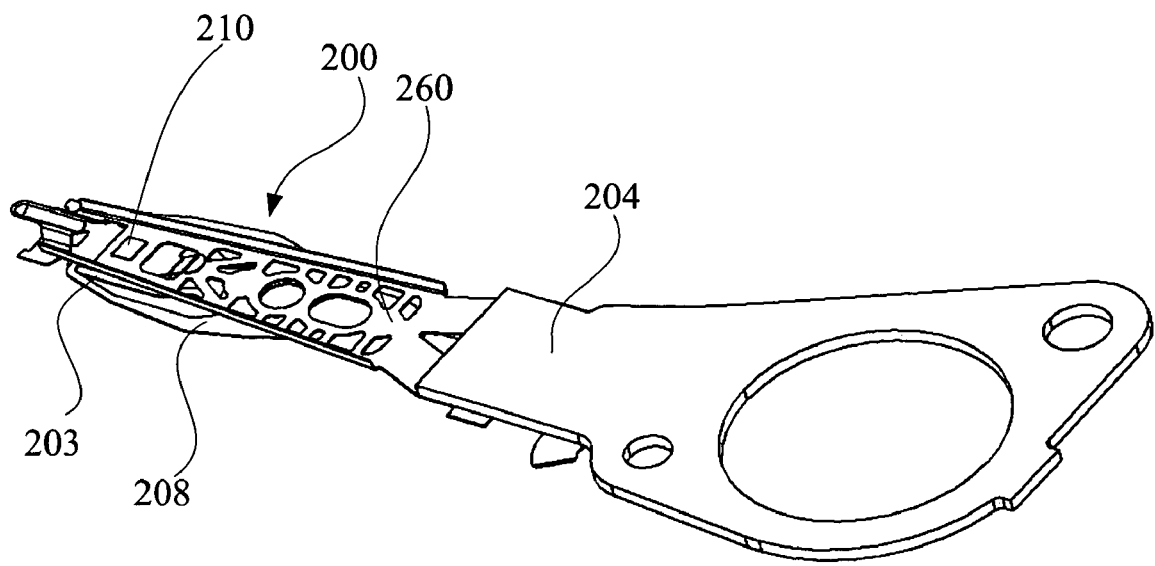
FIG. 3a shows a perspective view of a HGA according to an embodiment of the invention.
Figure 3B:
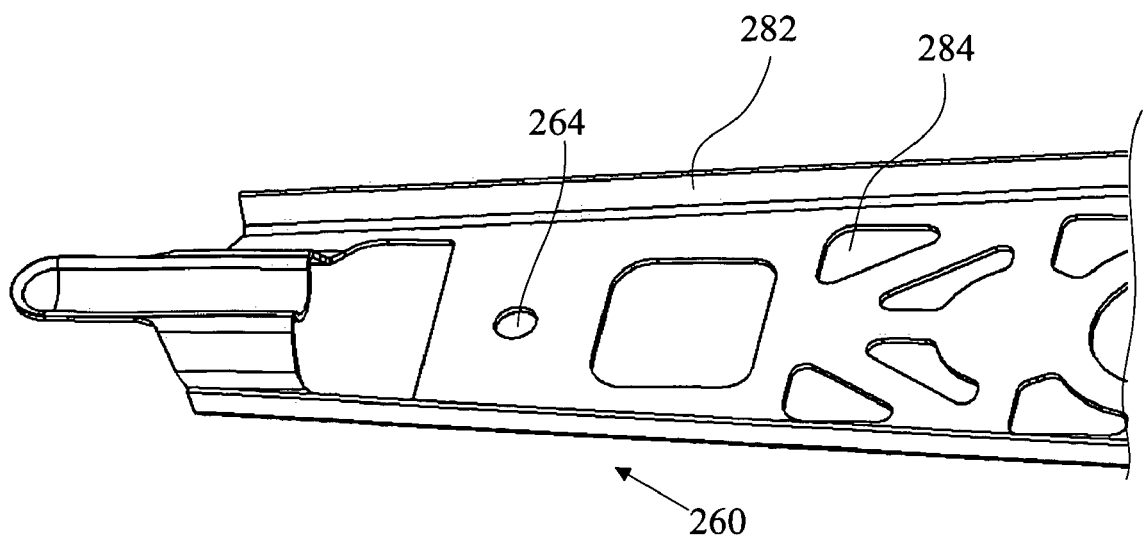

FIGS. 3a-3f show a HGA according to an embodiment of the invention. As illustrated, the HGA 200 comprises a load beam 260, a flexure 208 to connect with the load beam 260, a slider 203 held on the flexure 208 and a separate dimple element 210 mounted on the load beam 260. As shown in FIG. 3a, the whole HGA 200 is mounted to a motor arm 204, which in turn drives the whole HGA 200 and the slider 203 mounted thereon to rotate above a disk, thus realizing reading/writing operation of the slider 203.

The flexure 208 is preferably made of resilient material to resiliently support the slider 203 thereon. A plurality of traces (not shown) may be additionally or integrally formed on the flexure 208. The traces may be electrically connected to an external control system (not shown) used to control components of the HGA e.g. the slider 203. The slider 203 may be mounted on the flexure 208 by any suitable manner such as adhesive (for example epoxy, conductive film and the like). In addition, the slider 203 may be electrically connected with the above traces by suitable manner for example electrical connection balls, and by this electrical connection, the slider 203 is controlled by the external control system via the traces.

The load beam 260 may be formed of rigid material for example stainless steel to provide sufficient rigidity. The load beam 260 is connected with the flexure 208 by means such as laser welding or lamination. The load beam 208 serves to reliably support the flexure 208 and corresponding slider 203 thereon. Several structural holes 284 may be defined on the load beam 260 to optimize structure and reduce total weight of the load beam 260. Moreover, two rails 282 may be formed at both sides of the load beam 260 along its length direction to enhance stiffness thereof. A locating hole 264 aligned with a center of the slider 203, is formed on the load beam 260. Through the locating hole 264, the separate dimple element 210 can extend and engage the flexure 208 at a location consistent with the center of the slider 203.

Figure 3C:
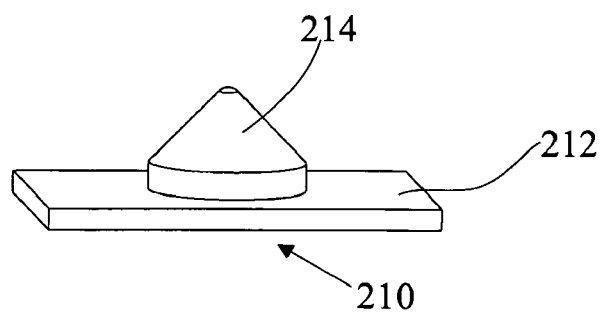
Figure 3D:
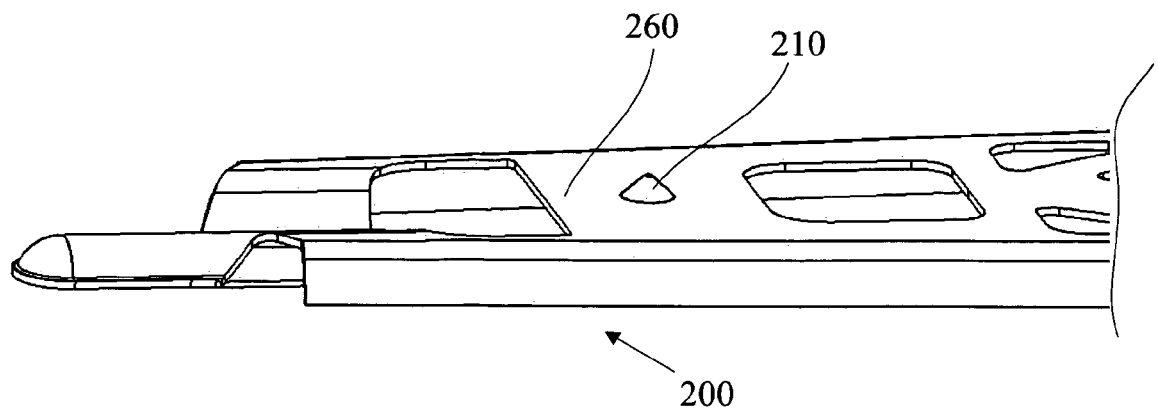
FIG. 3d shows a partial perspective view of the HGA of FIG. 3a illustrating assembling relationship between the load beam and the separate dimple element.
Figure 3E:
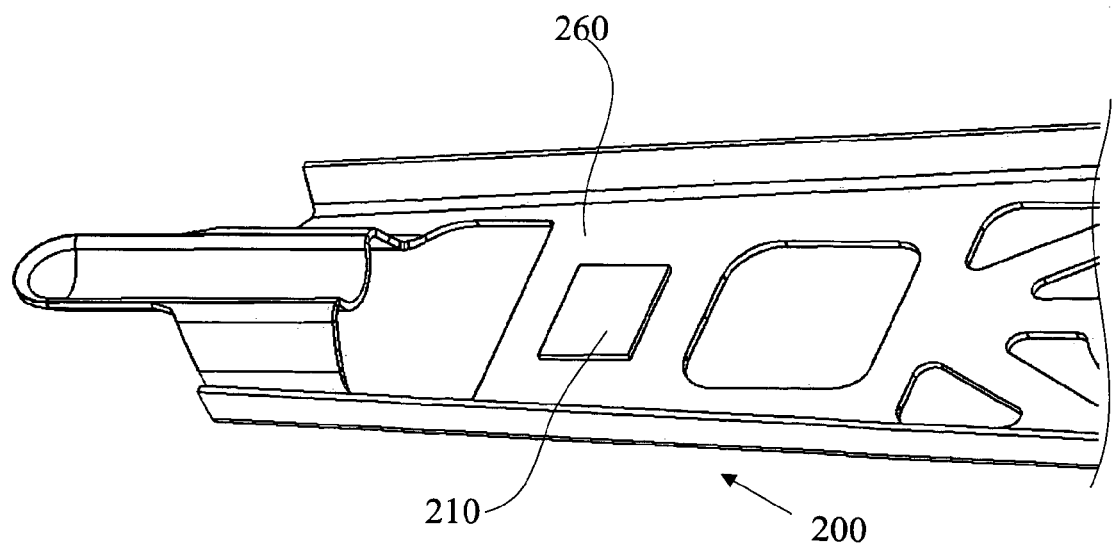
FIG. 3e shows another partial perspective view of the HGA of FIG. 3a illustrating an assembling relationship between the load beam and the separate dimple element.
Figure 3F:
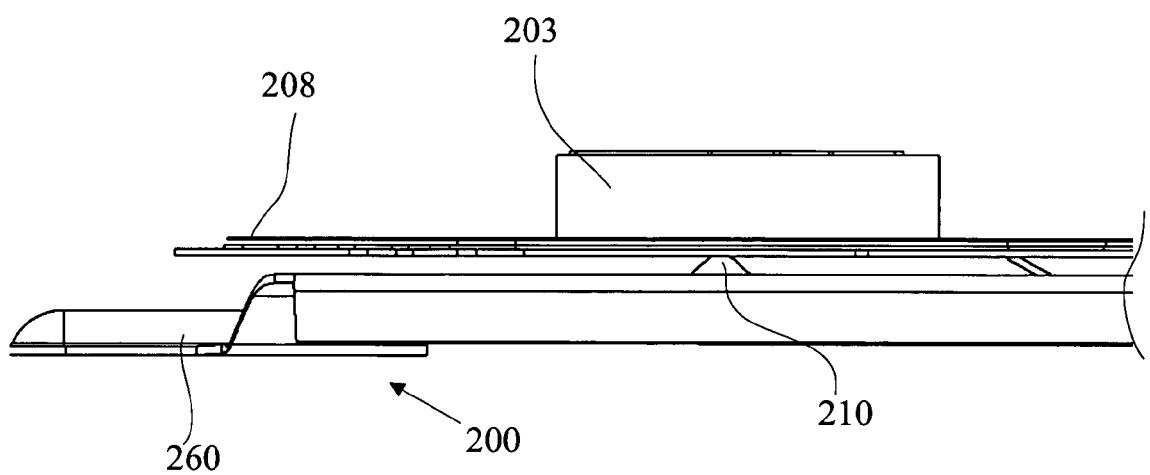

The separate dimple element 210 may be constructed by rigid material or stainless steel for providing enough stiffness. As best shown in FIG. 3c, the separate dimple element 210 comprises a base portion 212 and a dimple 214 extending upon the base portion 212. The dimple 214 extends through the locating hole 264 of the load beam 260 to support the flexure 208 at a position corresponding to a center of the slider 203. By properly contact of the dimple 214 with the flexure 208, the load forces generated by the load beam 260 can be evenly applied to the center of the slider 203, thus enabling the slider 203 flying with a stable attitude and flying height.

The separate dimple element 210 may be mounted to the load beam 260 by attaching its base portion 212 to the load beam 260 using any suitable manner such as laser welding or adhesive. Moreover, the base portion 212 may take any suitable shape, and in an embodiment of the invention, as shown in FIG. 3c, the base portion 212 is a flat plate with a large area, this flat plate makes the separate dimple element 210 fixed to the load beam 260 more reliably. Moreover, the base portion 212 and the dimple 214 may be separate members and assembled together as a combination, or may be an integrally formed structure.

Compared with conventional HGA, as the separate dimple element of the invention is an independent member, it can be fabricated independently; in addition, since structure of the separate dimple element is simpler than that of a load beam having an integrally formed dimple, fabrication of this separate dimple element is easier than fabrication of the load beam having an integrally formed dimple. Consequently, when a slider of smaller form factor is utilized, a small size of separate dimple can be manufactured easily and then be assembled, thus making the dimple supporting the flexure at a position corresponding to the center of the slider and keeping a small contact area between the dimple and the flexure.

In addition, since the load beam itself has no dimple structure directly formed thereon, the load beam is relatively flat, thus enabling the load beam and the flexure to be assembled together in a substantially parallel manner; and this parallel assembling manner improves positional accuracy of the load beam with respect to the flexure. Therefore, when a slider is accurately mounted on the flexure, the slider can also be highly aligned with the load beam. Furthermore, the locating hole provided on the load beam may also be used as a datum to precisely assembly the load beam and the flexure together.

Figure 4:
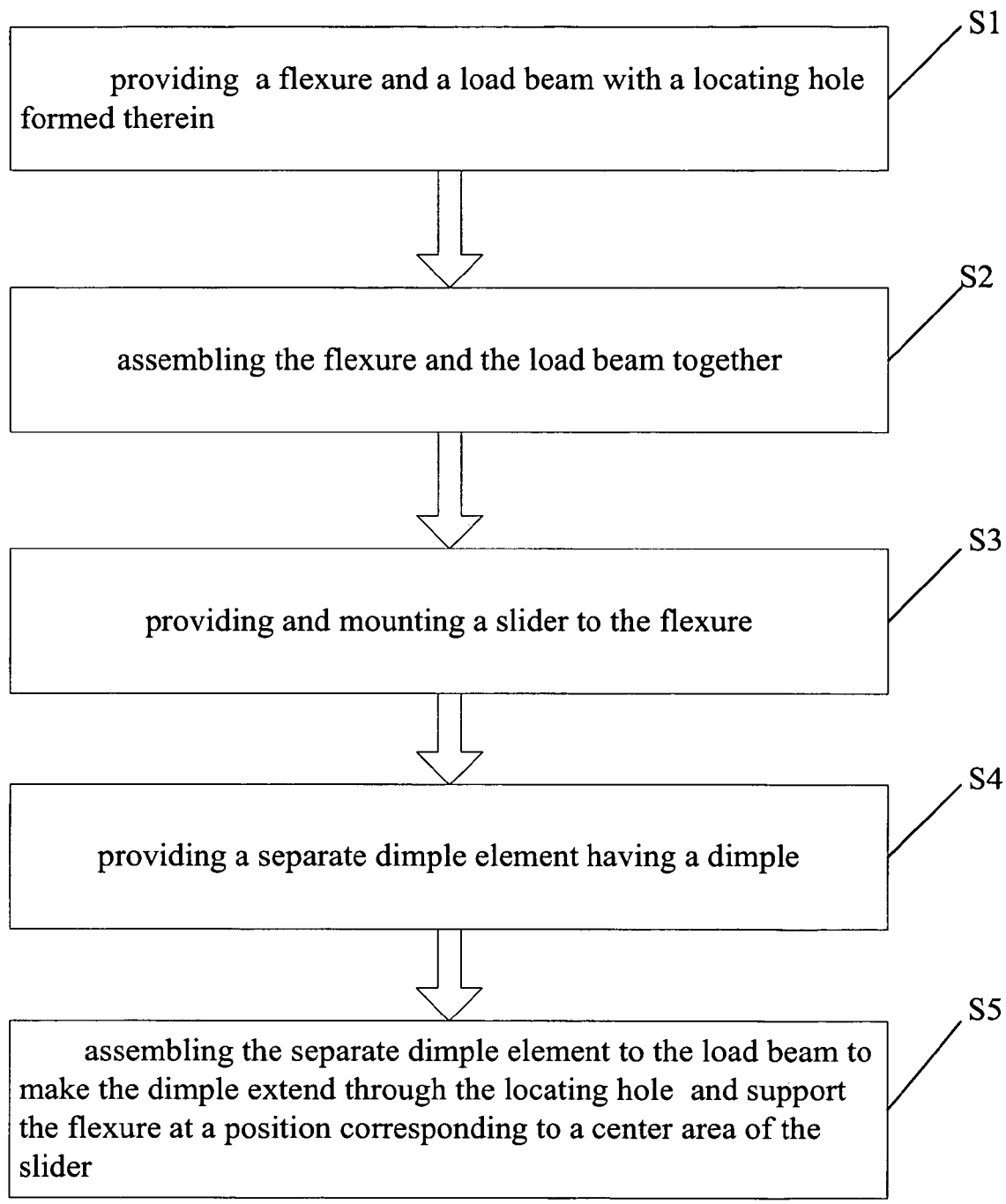
FIG. 4 shows a flowchart of manufacturing a HGA according to an embodiment of the invention.

Referring to FIG. 4, a method for manufacturing a HGA according to an embodiment of the invention comprises the steps of providing a flexure and a load beam with a locating hole formed therein (step 1); assembling the flexure and the load beam together (step 2); providing and mounting a slider to the flexure (step 3); providing a separate dimple element having a dimple (step 4); and assembling the separate dimple element to the load beam to make the dimple extend through the locating hole and support the flexure at a position corresponding to a center area of the slider (step 5).

In above method, the flexure and the load beam may be assembled together by any suitable manner. For example, in an embodiment, they can be combined together by adhesive e.g. epoxy or conductive film. In another embodiment, they can be assembled by laser welding or lamination. In the step 3, the slider may be bonded on the flexure physically and electrically. For example, the slider may be physically bonded on the flexure by suitable adhesive such as epoxy. The slider may be electrically connected to traces formed on the flexure by suitable manner such as electrical connection balls (golden balls or solder balls). Also, the slider may be physically mounted on the flexure fully or partially according to specific structure and application. As an alternative, the step of providing the separate dimple element may further comprise a step of forming a base portion, from which the dimple is extended. Also, the step of assembling the separate dimple element to the load beam may comprise a step of mounting the base portion to the load beam by suitable manner such as adhesive or welding.

Figure 5A:
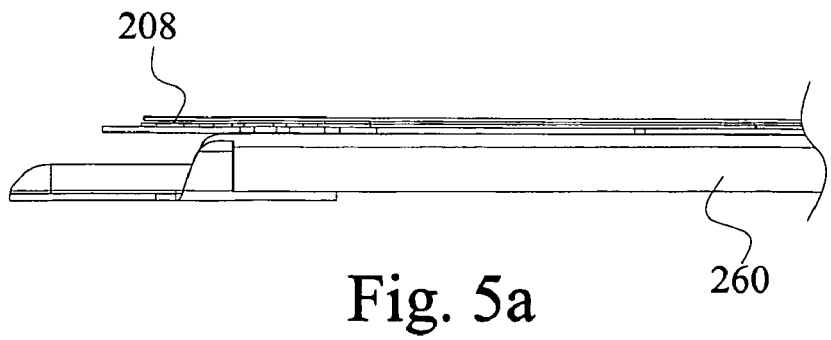
FIGS. 5a-5c are sequential views corresponding to the flowchart shown in FIG. 4, illustrating the process of manufacturing a HGA.
Figure 5B:
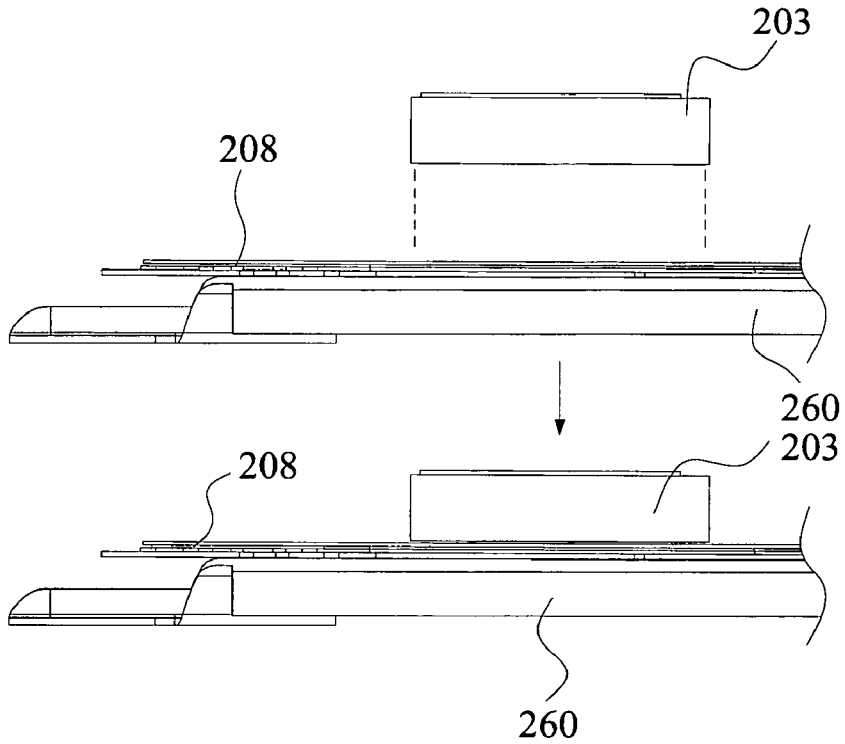
Figure 5C:
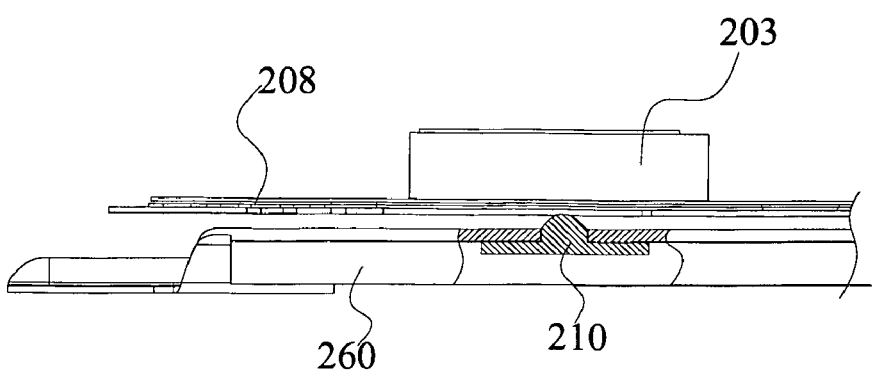

More specifically, as shown FIG. 5*a*, a flexure 208 and a load beam 260 with a locating hole 264 (refer to FIG. 3*b*) are assembled together in advance. In this situation, since no dimple is formed on the load beam 260, the load beam 260 and the flexure 208 are combined together in a parallel manner such that the flexure 208 can be located in a horizontal position, but not in an inclined position. Then, as shown in FIG. 5*b*, a slider 203 is mounted to the horizontal flexure 208 with a center of the slider 203 aligned with the locating hole of the load beam 260. Next, as shown in FIGS. 3*c*, 5*c*, a separate dimple element 210 comprising a base portion 212 and a dimple 214 extended from the base portion 212 is attached to the load beam 260 with its dimple 214 extending through the locating hole (not labeled) and its base portion 212 mounted to the load beam 260. The dimple 214 supports the flexure 208 at a position corresponding to the center of the slider 203.

In the above manufacturing process of HGA, since the flexure 208 is still in a horizontal condition after it is assembled with the load beam 260, comparing with the prior art that the flexure in a tilting condition, the slider is more easier to be mounted on the flexure, and an assembling accuracy between the slider and the flexure can be assured, and thus making the assembly of the HGA more easier and accurately.

As an alternative, a similar HGA manufacturing method comprises the steps of providing a flexure and a load beam with a locating hole formed therein; assembling the flexure and the load beam together; providing a separate dimple element having a dimple; assembling the separate dimple element to the load beam to make the dimple extend through the locating hole; providing and mounting a slider to the flexure such that the dimple supports the flexure at a position aligned with a center of the slider. Since no dimple is directly formed on the load beam, in process of assembling the load beam and the flexure, the load beam and the flexure can be connected together with a high positional accuracy.

Figure 6:
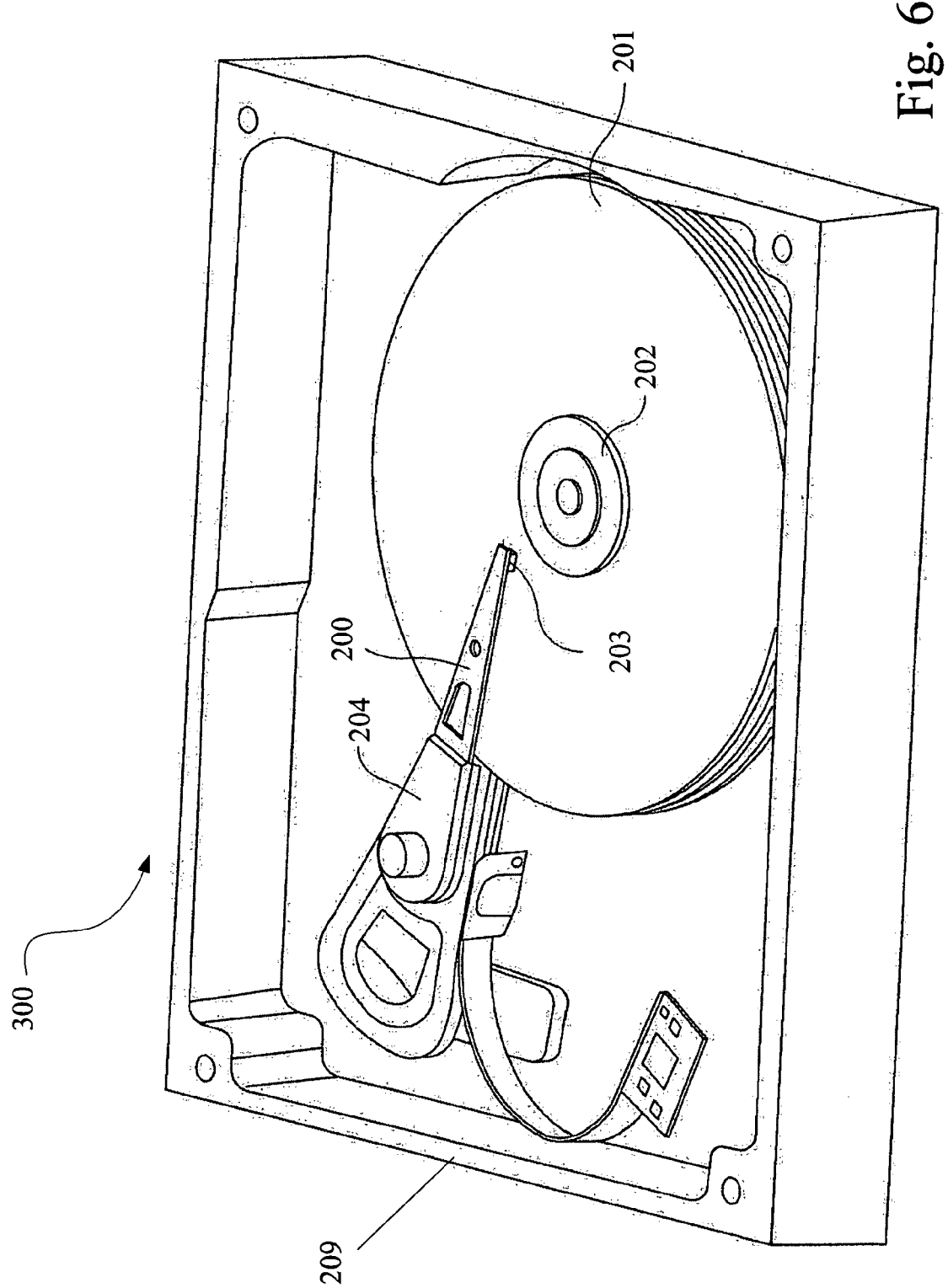
FIG. 6 shows a perspective view of a disk drive unit according to an embodiment of the invention.

Now referring to FIG. 6, according to an embodiment of the invention, a disk drive unit 300 comprises a HGA 200, a drive arm 204 connected to the HGA 200, a disk 201, and a spindle motor 202 to spin the disk 201, all of which are mounted in a housing 209. Because the structure and/or assembly process of disk drive unit of the present invention are well known to persons ordinarily skilled in the art, a detailed description of such structure and assembly is omitted herefrom.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A head gimbal assembly for a disk drive unit, comprising:
   a slider;
   a load beam having a locating hole formed therein;
   a flexure to support the slider and connect with the load beam;
   wherein a separate dimple element comprises a dimple to extend through the locating hole and support the flexure at a position corresponding to a center area of the slider, and a base portion to hold the dimple, by which the separate dimple element is fixed to the load beam, the base potion being a flat plate.

2. The head gimbal assembly according to claim 1, wherein the base portion is attached to the load beam by laser welding or adhesive.

3. A disk drive unit, comprising:
   a head gimbal assembly;
   a drive arm connected to the head gimbal assembly;
   a disk; and
   a spindle motor to spin the disk,
   wherein the head gimbal assembly comprises:
      a slider;
      a load beam having a locating hole formed therein;
      a flexure to support the slider and connect with the load beam; and
   wherein a separate dimple element comprises a dimple to extend through the locating hole and support the flexure at a position corresponding to a center area of the slider, and a base portion to hold the dimple, by which the separate dimple element is fixed to the load beam, the base potion being a flat plate.

* * * * *